UNITED STATES PATENT OFFICE.

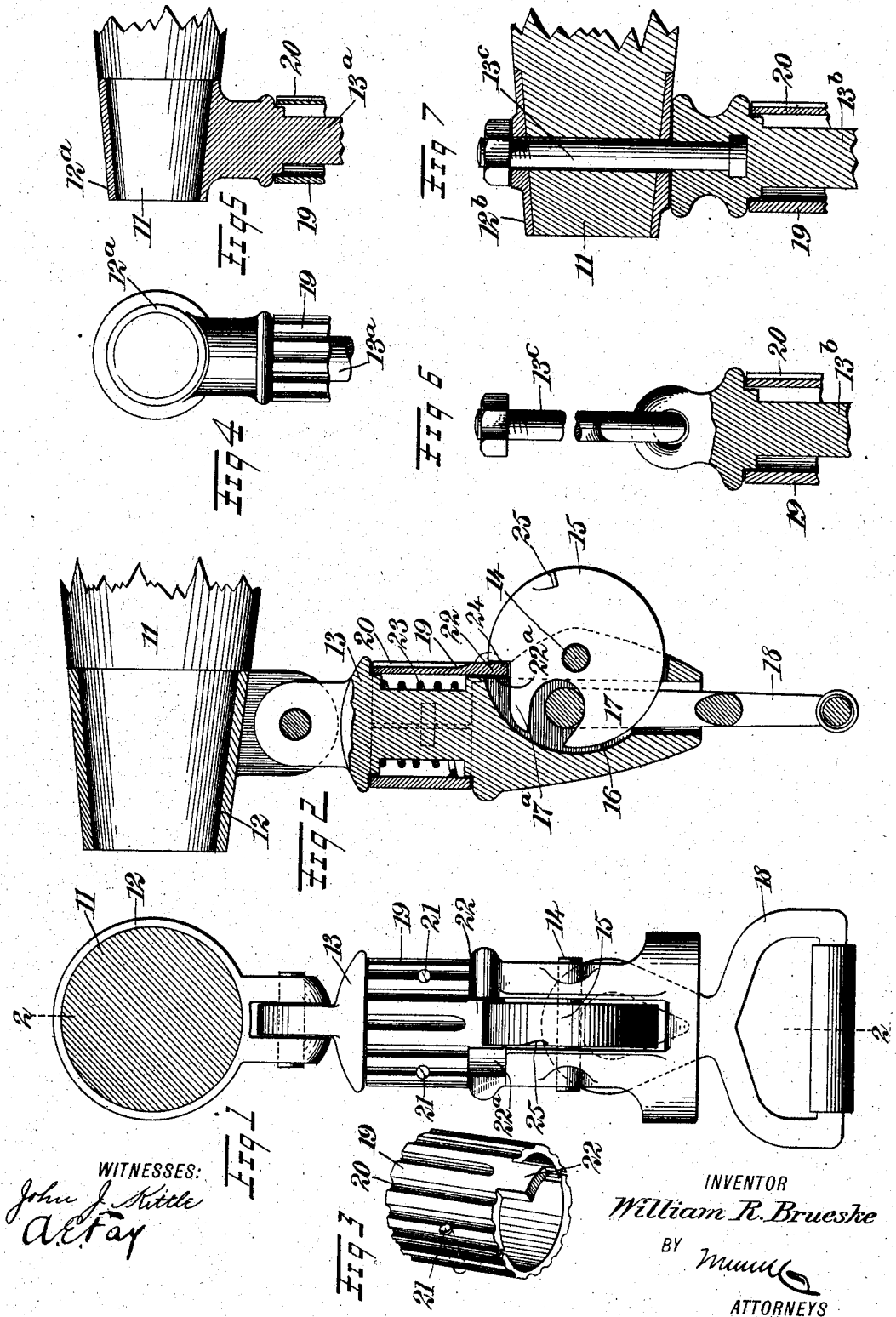

WILLIAM RENOLD BRUESKE, OF WIMBLEDON, NORTH DAKOTA.

WHIFFLETREE-HOOK.

No. 796,291. Specification of Letters Patent. Patented Aug. 1, 1905.

Application filed December 9, 1904. Serial No. 236,130.

*To all whom it may concern:*

Be it known that I, WILLIAM RENOLD BRUESKE, a citizen of the United States, and a resident of Wimbledon, in the county of Barnes and State of North Dakota, have invented a new and Improved Whiffletree-Hook, of which the following is a full, clear, and exact description.

My invention relates to a self-locking safety whiffletree-hook, but it is of such a nature that it can be applied to holding or fastening devices of various kinds.

The principal objects of my invention are to provide a holding or fastening device which will be automatically and securely locked when the article to which it is intended to be attached is applied, which may be readily and quickly attached and removed, and which will be absolutely safe.

Further objects of my invention will appear in the course of the subjoined description.

Reference is to be had to the accompanying drawings, forming a part of this specification, in which similar characters of reference indicate corresponding parts in all the figures.

Figure 1 is a plan view of a preferred form of my invention. Fig. 2 is a longitudinal sectional view on the line 2 2 of Fig. 1. Fig. 3 is a perspective view of a detail. Fig. 4 is a plan view of a modified form of my invention. Fig. 5 is a sectional view of the modification shown in Fig. 4. Figs. 6 and 7 are sectional views of further modifications, all of which come within the scope of my invention.

In Figs. 1 and 2, 11 indicates the end of a whiffletree which is provided with the usual or any ordinary form of collar 12. To this collar is pivoted a body 13, which is provided with a transverse shaft or stud 14, on which is journaled a disk 15. A semicircular groove 16 is provided in the body 13, in which the disk 15 is adapted to rest. The disk constitutes a hooking member for an eye or other device which is to be used in connection with it, and it is preferably provided with a hook-shaped extension 17, adapted to engage with a cockeye 18, for example, and is also provided with a tongue $17^a$. (See Fig. 2.) A sleeve 19 is mounted upon the shank of the body 13 and is provided with grooves 20 for the purpose of easily turning it upon its axis. It is preferably formed in two parts held together by pins or screws 21, and it has a projection 22 extending toward the disk 15 and working in a slot $22^a$ in the body 13.

A spring 23 is attached to the shank of the body 13 and to the sleeve 19 for the purpose of always returning the sleeve to the position shown in Figs. 1 and 2. These elements constitute an automatic locking device for the disk 15. The disk 15 is provided with two depressions 24 and 25, one in the edge and the other in the side face, for the purpose of engaging with the projection 22.

The manner of operating the device described will be obvious. Supposing the cockeye 18 to be in the position shown in Figs. 1 and 2, the sleeve 19 will be oscillated by hand on its axis in the slot $22^a$ so as to remove the projection 22 from the indentation 24. This will leave the disk in the same position, but will remove the locking device from operative position, so that a pull on the cockeye 18 will oscillate the disk 15 upon its axis and leave the device in position for the ready removal of the cockeye.

It will be seen that after the locking projection 22 is removed, as indicated, one slight pull upon the cockeye 18 will entirely remove it from the whiffletree. This operation will leave the disk in such a position as to permit the cockeye to be forced backwardly into the body 13 and into the opening in the disk and onto the tongue $17^a$, formed at the back of the opening. This operation will force the disk to revolve upon its axis, there being no force to prevent such movement, and the shape and position of the projection $17^a$ are such as to cause the motion of the cockeye into the body to force the disk around far enough to permit the projection 22 to be forced into the indentation 24 by means of the spring 23 and lock the parts in position, as shown in Figs. 1 and 2. The indentation 25 is not an absolutely necessary part of the device; but it is intended for the purpose of coming into contact with the forward edge of the projection 22 and not only holding the sleeve 19 from rotation, but also securing the disk 15 against further rotation in either direction.

Figs. 4 and 5 show a construction in which the body $13^a$, corresponding to the body 13 in the figures described, will be cast integral with the collar $12^a$, which corresponds to the collar 12. In this case the sleeve 19 and all other parts will be the same as those shown in Figs. 1 and 2.

In Figs. 6 and 7 the body 13$^b$ is connected with the collar 12$^b$ by means of a bolt 13$^c$ and secured by a nut on the rear side of the whiffletree. Figs. 6 and 7 show two different ways of attaching the bolt 13$^c$ to the body 13$^b$.

All these modifications come within the scope of my invention, and it will be obvious that many other changes may be made from the forms shown in the drawings without departing from the spirit of my invention, and I do not wish to be limited to the exact construction shown.

It will be obvious that my invention presents many advantages over the whiffletree-hooks now in use, as well as over other temporary fastening devices of a similar nature. It can be quickly and easily attached and released, and it is impossible to accidentally release the cockeye, which fact removes all liability of accident due to such disengagement. All that it is necessary to do in order to release the cockeye is to turn the sleeve, which can be done even when there is a strain on the trace, and it is not necessary to back the horses or move the vehicle. A great deal of time and bother are thus saved in the operation. The production of a large amount of slack before disengagement, which is necessary with many of the old forms of hooks, is not necessary with my invention, and there are no small bolts, pins, or other parts to get out of order or get lost. In many of the old forms of devices of this character a coating of ice or dirt is likely to clog the parts and render them useless; but such is not the case with the device herein described. There is no projecting part upon it which can strike a part of the harness or vehicle and unlock the catch.

Having thus described my invention, I claim as new and desire to secure by Letters Patent—

1. A whiffletree-hook, comprising a body, an oscillatable hooking member journaled thereon, means for locking said member, and means for pivotally mounting said body with respect to a whiffletree.

2. A whiffletree-hook, comprising a body movably mounted on a whiffletree, a disk rotatably journaled thereon, a hook extension on said disk, and means for locking the disk with respect to the body.

3. A whiffletree-hook, comprising a body movably mounted on a whiffletree, a hooking member rotatably journaled thereon, a hook extension on said member, and a spring-lock for said member located on said body.

4. A fastening device, comprising a body, a disk rotatably journaled thereon and having an indentation in its edge and an indentation in its face, a hook extension on said disk, and a locking device having a projection adapted to engage with said indentations.

5. A fastening device, comprising a body, an oscillatable hook member journaled thereon, and means for locking said member, comprising an oscillatable sleeve mounted on said body.

6. A fastening device comprising a body, an oscillatable hooking member journaled thereon, means for locking said member, comprising a sleeve, and a resilient means for oscillating said sleeve in one direction upon its axis.

7. A fastening device comprising a body, an oscillatable hook member mounted thereon and having an indentation, and means for locking said member comprising a sleeve, a spring for oscillating said sleeve on its axis, the said sleeve having a projection on said sleeve adapted to enter said indentation.

8. The combination of an oscillatable hooking member having a plurality of indentations, and an oscillatable sleeve having means for engaging with said indentations and locking said hooking member.

9. The combination of a body having a groove therein, a disk journaled in said groove, and having a hooked projection adapted to engage an eye, and a second projection for receiving a thrust and turning the disk upon its axis, an oscillatable sleeve upon said body, and a spring operatively connected with said sleeve to operate it upon its axis, said sleeve having means for locking the disk with respect to the body, and said disk having means for locking the sleeve with respect to the body.

In testimony whereof I have signed my name to this specification in the presence of two subscribing witnesses.

WILLIAM RENOLD BRUESKE.

Witnesses:
A. C. OLSEN,
R. F. RINKER.